(12) United States Patent
Krasner et al.

(10) Patent No.: US 7,904,053 B2
(45) Date of Patent: *Mar. 8, 2011

(54) METHOD AND APPARATUS FOR COMMUNICATING EMERGENCY INFORMATION USING WIRELESS DEVICES

(75) Inventors: Norman F. Krasner, Emerald Hills, CA (US); Thomas G. Wolf, Mountain View, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/497,426

(22) Filed: Jul. 2, 2009

(65) Prior Publication Data

US 2009/0286504 A1 Nov. 19, 2009

Related U.S. Application Data

(63) Continuation of application No. 11/538,436, filed on Oct. 3, 2006, now Pat. No. 7,574,195, which is a continuation-in-part of application No. 10/441,514, filed on May 20, 2003, now Pat. No. 7,289,786.

(60) Provisional application No. 60/440,969, filed on Jan. 16, 2003.

(51) Int. Cl.
*H04M 11/04* (2006.01)
(52) U.S. Cl. .................. 455/404.2; 455/404.1; 340/436
(58) Field of Classification Search ............... 455/456.1; 701/36, 357.07; 340/436, 438
See application file for complete search history.

(56) References Cited

U.S. PATENT DOCUMENTS

| | | | |
|---|---|---|---|
| 5,742,666 A | | 4/1998 | Alpert |
| 5,777,580 A | | 7/1998 | Janky et al. |
| 6,014,555 A | * | 1/2000 | Tendler ...................... 455/404.1 |
| 6,282,491 B1 | | 8/2001 | Bochmann et al. |
| 6,340,928 B1 | * | 1/2002 | McCurdy ...................... 340/436 |
| 6,442,485 B2 | | 8/2002 | Evans |
| 6,480,144 B1 | | 11/2002 | Miller et al. |
| 6,483,865 B1 | | 11/2002 | Beierle |
| 6,485,081 B1 | | 11/2002 | Bingle et al. |
| 6,493,629 B1 | | 12/2002 | Van Bosch |

(Continued)

FOREIGN PATENT DOCUMENTS

CN 1189960 8/1998

(Continued)

OTHER PUBLICATIONS

International Search Report-PCT/US2004/001227, International Searching Authority-European Patent Office-Jul. 1, 2004.

(Continued)

*Primary Examiner* — Phuoc Doan
(74) *Attorney, Agent, or Firm* — Jimmy Cheng; Shyam K. Parekh (57) ABSTRACT

A method and apparatus for providing emergency notification by a wireless mobile device in response to triggering a sensor. A detection system, which may be located within a vehicle, comprises one or more sensors configured to sense an emergency event and transmit a message via a wireless link regarding the emergency event. For example, the wireless mobile device may be programmed to call a predetermined emergency number such as E911, and transmit data including position and other information from the mobile device to the emergency number in response to the received message.

15 Claims, 5 Drawing Sheets

U.S. PATENT DOCUMENTS

| | | | |
|---|---|---|---|
| 6,502,034 B1 | 12/2002 | Miller | |
| 6,505,507 B1 | 1/2003 | Imao et al. | |
| 6,580,916 B1 * | 6/2003 | Weisshaar et al. | 455/456.1 |
| 6,696,956 B1 | 2/2004 | Uchida et al. | |
| 6,711,399 B1 | 3/2004 | Granier | |
| 6,766,233 B2 | 7/2004 | Odinak et al. | |
| 7,099,835 B2 | 8/2006 | Williams, III | |
| 2002/0137489 A1 | 9/2002 | Dutta et al. | |
| 2002/0173889 A1 * | 11/2002 | Odinak et al. | 701/36 |
| 2004/0104814 A1 | 6/2004 | Christensen et al. | |

FOREIGN PATENT DOCUMENTS

| | | |
|---|---|---|
| JP | 2001028644 | 1/2001 |

OTHER PUBLICATIONS

Written Opinion-PCT/US2004/001227, International Searching Authority-European Patent Office-Jul. 1, 2004.

International Preliminary Report on Patentability-PCT/US2004/001227, International Preliminary Examining Authority/ US-Alexandria, Virginia-Nov. 28, 2006.

* cited by examiner

METHOD AND APPARATUS FOR COMMUNICATING EMERGENCY INFORMATION USING WIRELESS DEVICES

RELATED APPLICATIONS

This application is a continuation of U.S. patent application Ser. No. 11/538,436, entitled "Method and Apparatus for Communicating Emergency Information Using Wireless Devices," filed on Oct. 3, 2006, which is a continuation-in-part of U.S. patent application Ser. No. 10/441,514, entitled "Method and Apparatus for Communicating Emergency Information Using Wireless Devices," filed on May 20, 2003, now U.S. Pat. No. 7,289,786, which claims priority to U.S. Provisional Application No. 60/440,969, filed on Jan. 16, 2003.

BACKGROUND OF THE INVENTION

1. Field of the Invention

The present invention generally relates to wireless mobile devices that incorporate wireless telecommunication, and optionally position location systems, for automatically notifying a network entity in response to an event, such as an accident.

2. Description of Related Art

Telematics is broadly defined as the utilization of computers and wireless telecommunications to efficiently convey information over networks to improve business functions and public services. The term telematics commonly refers to automobile systems that combine global positioning satellite (GPS) tracking and other wireless communications for automatic roadside assistance and remote diagnostics.

Conventional telematics units such as those described below suffer from disadvantages including high complexity and high cost. For example high costs are attributed to purchase price, installation within an automobile (or other device), and subscriber services. Furthermore, conventional telematics units that are capable of automatically responding to a vehicular event (e.g. a collision) are hard-wired to the vehicle so that information from the sensor or other detector within the vehicle can be sent to the telematics unit. Installation of such a telematics unit is costly and complex.

U.S. Published Patent Application 2001/0014863 to Williams discloses a telematics device that provides services such as emergency roadside data services and other on-board services (e.g. grocery services through a central server). The telematics device is embedded in a vehicle or other telematics device such as cellular telephone, PDA, or laptop computer such that a customer may request services, such as emergency services, for example. The telematics device of the Williams patent suffers from disadvantages because it requires communication with a server to provide information and services, and requires user initiation in order to activate an emergency call (which may be difficult when accident victims are suffering from injuries or are incapacitated).

U.S. Pat. No. 6,282,491 to Bochman et al. discloses a telematics device for a motor vehicle in which a car radio with a radio data system (RDS) module, a wireless telephone, and a positioning and navigation system are provided in one housing. The Bochman patent discloses that an emergency call may be placed by pressing a button or entering an identification number on a chip card, after which information, such as location, number of people involved in the accident, the type of injuries sustained, and information about hazardous materials or other dangerous situations may be transmitted. The telematics device of the Bochman patent suffers from disadvantages because it requires installation within a standard bay in the vehicle, and requires user initiation in order to activate an emergency call.

U.S. Pat. No. 6,442,485 to Evans discloses an automatic system installed within a vehicle for location determination, collision notification, and synthetic voice communication. The automatic vehicle location and collision notification system is able to ascertain whether a vehicular collision has occurred and communicates directly with an emergency facility. The system transmits vehicle collision and location data via a synthetic voice communication generated from a data to speech translation module. The system includes a controller with a memory, a GPS receiver, and means for wireless communication; however the system suffers from at least one disadvantage in that the entire system is installed within a vehicle which is costly and does not allow for upgrades without replacing the installed system.

U.S. Published Patent Application No. 2002/0173889 to Odinak et al. discloses a vehicle device system that combines the functionalities of integrating vehicle controls, monitoring systems, location tracking and wireless communications into a device with module receptacles to receive insertable modules that are replaceable, transferable, and upgradeable for performing one of a plurality of telematic functions. The Telematic Control Unit (TCU) includes a processor, a built-in GPS unit, a cellular device, a vehicle information component, a user interface and a module device. The TCU of the Odinak patent suffers from disadvantages because it requires a server to communicate information to and from a vehicle to provide a variety of services to the vehicle, and it must be plugged into a vehicle for active communication between the vehicle and TCU.

Accordingly, there is a need for a readily available, low cost system and method for providing automated emergency service notification that may be implemented without costly purchases, installation and/or subscriber services.

SUMMARY OF THE INVENTION

A method and apparatus are disclosed for providing emergency notification by a wireless mobile device, which has wireless telecommunication and position location capability. The device receives a short range wireless transmission about an emergency event and automatically places an E911 call to a Public Safety Answering Point (PSAP), or other emergency response service, with information indicating location, nature of incident and other details. The emergency notification is triggered by a sensor located remote from the wireless mobile device (e.g. within a vehicle) that communicates with the mobile device via a short range wireless link to initiate the notification process. Because the wireless mobile device receives event information via a short range wireless link, one device may be advantageously utilized in a plurality of locations (e.g. vehicles and buildings). Thus, a single wireless mobile device is capable of performing telematics services in numerous locations, without the startup and maintenance costs associated with conventional implementations of telematics, utilizing electronics (e.g. cellular telephone) already heavily embraced by consumers.

An emergency event, such as an accident, unsafe poisonous gas levels, or fire, for example, may be sensed by one or more sensors within a vehicle. A short range wireless transmitter within the vehicle then transmits a message regarding the triggering of the sensor(s). A wireless mobile device within short range of the transmitter receives the message via a short range receiver located therein. The wireless mobile device processes the message regarding the triggering of the sensor; for example, the wireless mobile device may be programmed to determine position information about the wireless transmitter and/or mobile device, and call a predetermined emergency number such as E911 and transmit data including the position and other information from the mobile device to the emergency number, in response to the received message.

A detection system, which may be located within a vehicle, comprises one or more sensors configured to sense an emergency event, a detection system processor electrically coupled to the sensor and configured to process data received from the sensor, and a short range wireless transmitter configured to transmit messages from the detection system processor within a predetermined range. Some examples of sensors that may be implemented include accelerometers, airbag release sensors, heat sensors, fire detectors, and impact sensors.

The wireless mobile device, which is located remote from the detection system, comprises a short range wireless receiver capable of receiving messages from a local wireless transmitter, a notification system electrically coupled to the receiver and configured to process the messages received from the transmitter, a position location system electrically coupled to the notification system that provides position information upon request from the notification system, and a two-way wireless telecommunications system electrically coupled to the notification system, wherein the telecommunications system is configured to call a predetermined emergency number upon request from the notification system and to provide a data transmission via a wireless telecommunication link including the position and other information during the call.

The short range wireless receiver may be configured to receive a transmission within a range of 0.1 to 50 meters in one embodiment. The short range wireless receiver and short range wireless transmitter are compatible devices such that they can communicate with each other, for example they may be devices that comply with the 802.11b specification or the Bluetooth specification.

The notification system may comprise a suitable microprocessor capable of processing messages received from the detection system. The notification system includes programming that enables automatic notification and data transmission of information to and from an emergency number via the telecommunication system.

The telecommunication system may comprise a cellular telephone in one embodiment, and the telecommunication system may be capable of one-way or two-way data communication, voice communication, or some combination thereof with the emergency number via a wireless telecommunication link.

The position location system may comprise a GPS receiver in one embodiment. The position location system may provide position information including one of a latitude and longitude of the mobile device, a plurality of GPS pseudo-ranges, and a plurality of relative times-of-arrivals of signals from a plurality of base stations.

It should be noted that the short range wireless link and the two-way wireless telecommunication link are separate communication links. The wireless mobile device can communicate on both the short range wireless link and the wireless telecommunications link sequentially in one embodiment, or concurrently in an alternative embodiment.

In some embodiments, the short range link and the wireless telecommunication link use different protocols for communication; for example the short range wireless link may utilize a Bluetooth protocol, and the telecommunication link may utilize a cellular system protocol, such as Code Division Multiple Access (CDMA) or Global System for Mobile Communications (GSM). In some alternative embodiments, both links may utilize the same protocol, for example both links may comply with the 802.11 standard. Regardless of the protocol used, the links are separate in their communication.

In another embodiment, the sensor, processor and wireless communication device are integral to one device.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described in the following description with reference to the figures, in which like numbers represent the same or similar elements.

Glossary of Terms and Acronyms

The following terms and acronyms are used throughout the detailed description:

802.11 A family of IEEE standards for wireless LANs.
Base station A fixed station that communicates with mobile devices, such as a cell site in a cellular phone network.
E911 A program initiated by the FCC that requires the telephone numbers, position and other information about a wireless phone to be provided by a wireless carrier to a PSAP upon request.
GPS Global Positioning System
Mobile device A portable device, such as a cellular telephone, typically carried by a user whose location is to be determined.
PSAP Public Safety Answering Point. An emergency response service that receives and processes 911 and E911 emergency calls.
PSTN Public Switched Telephone Network. A voice and data telecommunications system for the general public use which uses switched lines.
Vehicular Event Any measurable occurrence in a vehicle, such as air bag release, excessive speed, rapid deceleration, fire, etc.
VIN Vehicle Identification Number

DESCRIPTION

Figure 1:
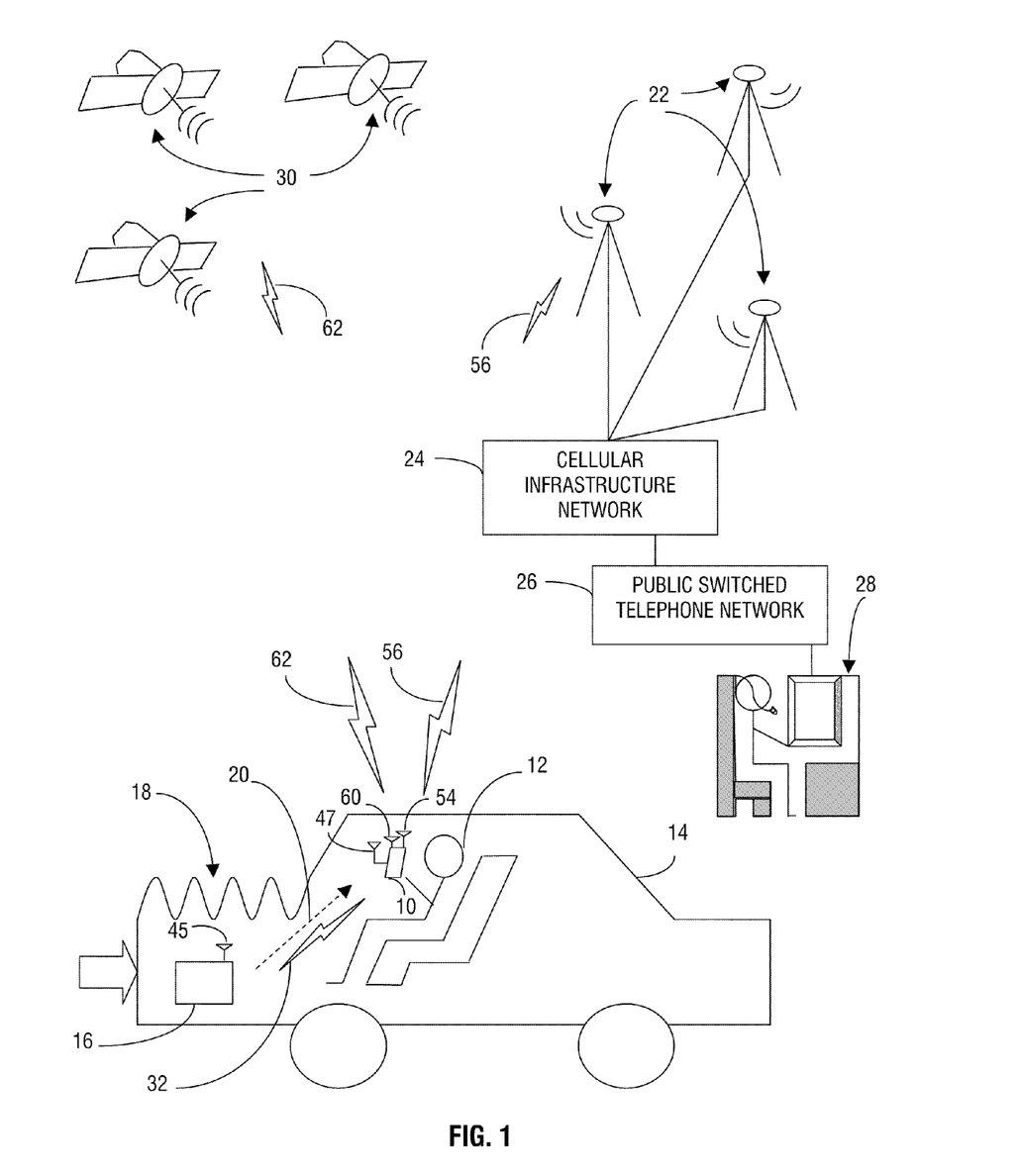
FIG. 1 is a perspective view that shows a vehicle involved in a collision, a user within the vehicle holding a wireless mobile device, and cellular and GPS systems.

FIG. 1 illustrates one environment in which the present invention can be implemented. In the illustrated environment, a wireless mobile device that has cellular and GPS capabilities is located in a vehicle. Such wireless devices are becoming commonplace in the United States, in response to the E911 initiative, and are also common in many other countries.

FIG. 1 is a perspective view showing a wireless mobile device 10 held by a user 12 within a vehicle 14 that has a detection system 16 therein. A collision is evidenced by damage to the vehicle shown at 18. An event message 20 regarding the vehicular event can be transmitted from the detection system 16 to the mobile device 10 via a wireless link 32. A plurality of cellular base stations 22 are interconnected by a cellular infrastructure network 24, which is connected to a Public Switched Telephone Network (PSTN) 26 which in turn may be used to access a Public Safety Answering Point (PSAP) 28. A plurality of GPS satellites 30 provide position location information.

Figure 2:
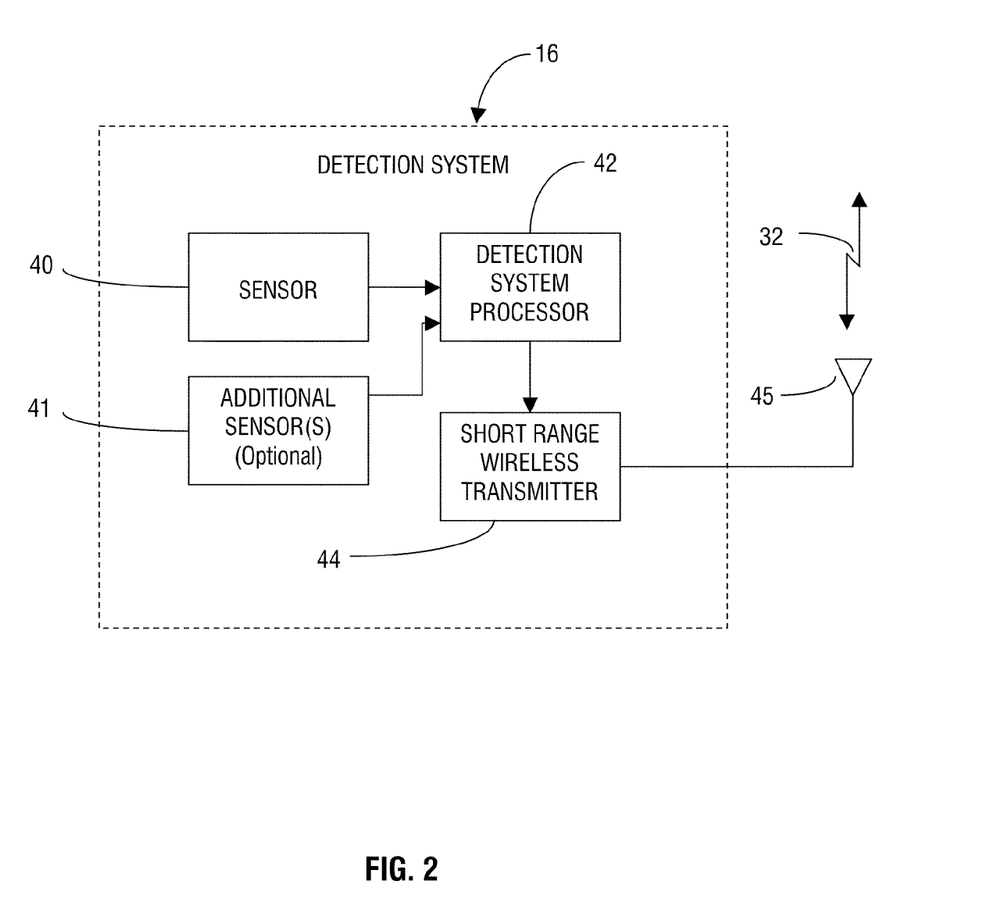
FIG. 2 is a block diagram of a detection system in one embodiment that incorporates one or more sensor(s), a processor, and a short range wireless transmitter.

The detection system 16, as will be described elsewhere in detail such as with reference to FIG. 2, is capable of determining when a vehicular event (e.g. collision) has occurred, and transmitting an event message 20 through antenna 45 via a wireless communication link 32 therefrom. The vehicular event may be any measurable occurrence in a vehicle for example collision, fire, heat, poisonous gas, air bag release, excessive speed, rapid deceleration, and an emergency trigger button actuated by a user.

The wireless mobile device 10, as will be described elsewhere in detail such as with reference to FIG. 3, comprises a short range wireless receiver, which may be a transceiver in some embodiments, that receives the event message 20 from the detection system 16 through antenna 47 when the mobile device is within range. In response to the event message 20, a notification system within the mobile device 10 automatically dials a predetermined number, such as E911, using a cellular telephone also located within the mobile device 10. The cellular telephone transmits data from the wireless device 10 using antenna 54 to transmit electromagnetic signals to a cellular tower 22 via a wireless telecommunication link 56. The wireless mobile device additionally comprises a position location system, such as a GPS receiver, that uses antenna 60 to receive signals from downlinks 62 from a multiplicity of GPS satellites 30 and process its position therefrom. In some embodiments, the antenna 60 is buried within the enclosure of the mobile device 10; in other embodiments the antenna 60 may be common with the antenna 54.

The plurality of cellular base stations 22 comprise any collection of cellular base stations utilized as part of a communication network for connection with the cellular telephone located within the mobile device 10. The cellular base stations 22 are connected to a cellular infrastructure network 24 that provides communication services with a plurality of other communication networks such as the PSTN 26. In one example, the cellular infrastructure network 24 provides communication that allows the wireless device 10 to communicate with a Public Safety Answering Point (PSAP) 28 using the cellular base stations 22 and the PSTN 26. The wireless telecommunication link 56 transmits voice and data between the cellphone located within the wireless device 10 and the cellular base stations 22.

The GPS satellites 30 comprise any group of satellites that transmit GPS downlinks 62 used for positioning by a GPS receiver. Each satellite has a computer and a clock and radio on board, and continually broadcasts its changing position and time. A GPS receiver, such as described in detail with reference to FIG. 3, is housed within or is coupled to the wireless mobile device 10 and trilaterates its own position by processing the signals from downlinks 62 from three or more satellites 30, resulting in a longitude and latitude position that can be very accurate. In some GPS receivers, timing information that is derived from the processing of the received GPS signals from downlinks 62 is provided over a cellular (or other wireless link) to a remote entity which in turn computes the position of the GPS receiver. Such systems are sometimes called Assisted GPS receivers (AGPS). The position location system described could include either conventional and/or AGPS receivers, as well as other position location devices and methods.

It should be understood that the present invention could be implemented in a variety of environments; for example instead of a vehicle, the environment could comprise a building or other structure in which an accident might occur such as an airport, chemical plant or office building; and the wireless mobile device could be implemented in a variety of housings such as a cellular telephone, GPS receiver device, or laptop computer.

FIG. 2 is a block diagram of one embodiment of the detection system 16, which is incorporated within a vehicle. In this embodiment, the detection system 16 comprises one or more sensors 40, 41, a detection system processor 42, a short range wireless transmitter 44, and an antenna 45. It should be understood that these parts may be housed physically together or merely electrically coupled together to provide communication therebetween. In alternative embodiments, wireless communication may be used to allow the parts of the detection system to communicate.

The sensor 40 is connected to the vehicle and is configured in any suitable arrangement to sense a vehicular event. One or multiple additional sensor(s) 41 may be incorporated in order to detect different types of, or different locations of, vehicular events. Examples of vehicular sensors include: accelerometers, airbag release sensors, heat sensors, fire detectors, and impact sensors. Additionally, if this system were implemented in an alternative environment, such as a plant or building as described elsewhere herein, the detection system could include any number of different sensors, for example fire alarm release sensors, security breach sensors, chemical spill sensors, and poisonous gas sensors.

The detection system processor 42 is connected to the sensor(s) 40, 41 and comprises any suitable microprocessor programmed to recognize and process data sent from the sensor(s) 40, 41 and to perform various tasks based on the data received. For example, the detection system processor 42 can interpret vehicular events sensed by the sensor(s) 40, 41 and instruct the transmitter 44 to transmit an event message via a wireless link 32. Additionally, the detection system processor 42 may be connected to memory (not shown) which stores additional vehicular information such as historical speed, vehicle identification number (VIN), and owner information that may be transmitted with the event message.

In some embodiments, the event message may include information indicative of an emergency, thereby informing the wireless mobile device of an emergency situation, which may cause the mobile device to communicate with the emergency response service in response thereto. For example, the emergency information may comprise one of a set of standardized messages recognizable by the emergency response service, a request for emergency assistance from at least one of medical personnel, police department, and fire department, and data indicating a priority level of emergency to be transmitted to the emergency response service.

The short range wireless transmitter 44 is connected to the detection system processor 42 and an antenna 45. In one embodiment, the transmitter 44 transmits data from the detection system processor 42, such as event messages 20 as described above via antenna 45 and through wireless link 32.

Thus, the short range wireless transmitter 44 within the vehicle enables communication of information to compatible short range wireless receivers (e.g. within the mobile device) within a predetermined range, thereby eliminating the costly and complex installation and other services conventionally required in telematics and similar devices. In some embodiments, the transmitter 44 may be a transceiver such that messages may be sent and received.

In one embodiment, the predetermined range of the transmitter is about two meters. In this embodiment, the transmitter is configured for in-vehicle operation only; that is, the mobile device 10 will receive transmissions only when it is located within the vehicle or in close proximity thereto. In other embodiments, the range of the transmitter could be between about 0.1 to 50 meters, 0.1 to 100 meters, or more.

The short range wireless transmitter 44 may comprise any of a number of wireless communication systems, such as an 802.11 wireless network communication system or a Bluetooth™ system. An 802.11b system, for example, provides a transmission rate of 1 to 11 Mbps in the unlicensed 2.4 GHz band using direct sequence spread spectrum (DSSS) technology; this is also known as "Wi-Fi" (Wireless Fidelity). In the "ad hoc" or "peer-to-peer" mode of 802.11 systems, wireless devices can communicate with each other directly as independent basic service sets (IBSS), with the speed of the communication being dependent upon the distance of the wireless devices from each other. In some embodiments, 802.11b systems are implemented to communicate up to a distance of about 50 meters. In other embodiments, the wireless systems are implemented to communicate within a range of about 2 to 30 meters. It should be noted that the range is a function of the transmitted power and signal blockage conditions.

Another example of a short-range wireless transmitter is one using the Bluetooth™ communications standard. Radios that comply with the Bluetooth™ wireless specification operate in the unlicensed, 2.4 GHz radio spectrum. These radios use a spread spectrum, frequency hopping, full-duplex signal at up to 1600 hops/sec. The signal hops among 79 frequencies at 1 MHz. The data rate is 1 Msymbol per second and the encoding is Gaussian Frequency Shift Keying (GFSK). The maximum communications distance for Bluetooth™ Power Class 2 (2.5 mW max output) is about 50 meters, although typically it is less due to non line-of-sight conditions.

Although 802.11 and Bluetooth™ systems are described as example embodiments, it should be understood that any short range wireless communication link, or even a small point-to-point link, may be implemented to function as a wireless transmitter/receiver. Proxim's OpenAir™ and Home RF™ are additional examples of short range wireless communication links on the market that may be implemented.

Figure 3:
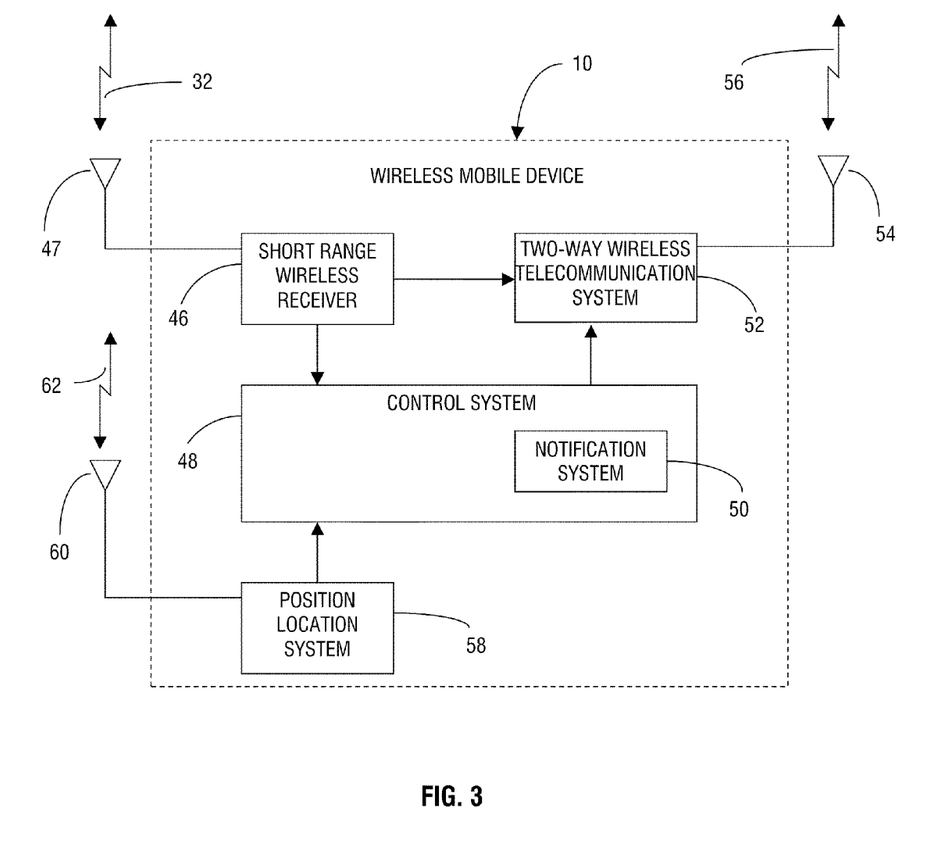
FIG. 3 is a block diagram of a wireless mobile device in one embodiment that incorporates a short range wireless receiver, a control system that includes a notification system, a two-way wireless telecommunication system, and a position location system implemented together in one mobile housing.

FIG. 3 is a block diagram of one embodiment of the wireless mobile device 10. In the illustrated embodiment, the wireless mobile device 10 comprises a short range wireless receiver 46, a control system 48 that includes a notification system 50, a two-way wireless telecommunication system 52 (e.g., a cellphone), and a position location system 58 implemented together in one mobile housing.

The short range wireless receiver 46 comprises any suitable receiver that is compatible with the short range wireless transmitter 44 such as described in detail with reference to FIG. 2. The antenna 47 receives the event message 20 sent via the wireless link 32 from the transmitter 44, which may be received by the receiver 46 when the transmitter and receiver are in range of each other.

The control system 48 comprises any suitable hardware and software that enables processing of data within the wireless mobile device. The control system is connected to the short range wireless receiver 46, the two-way wireless telecommunications system 52, and the position location system 58. The control system 48 includes programming that determines how to process data, for example event message(s) received by the short range wireless receiver 46, position information received from the position location system 58, and message(s) to be sent via the telecommunications system 52.

In one embodiment, the control system 48 comprises a notification system 50 that is triggered in response to an event message 20 received via the wireless link 32 by the short range wireless receiver 46. The notification system 50 comprises any suitable microprocessor and includes programming enabling automatic notification and data transmission of information to and from a predetermined emergency number via the wireless telecommunications system 52. The notification system 50 may be as simple as an auto-dialing program that allows for automatic dialing of E911 in one embodiment. However, the notification system may also be configured to process, send and receive more complex data to and from an emergency service (e.g. PSAP), such as position information and additional vehicular information in some embodiments. In some embodiments, the notification system 50 may be configured to process, send and receive messages to and from the short range wireless transmitter 44 housed within the vehicle 14, for example requesting vehicular information; in this embodiment, the short range wireless transmitter 44 and the short range wireless receiver 46 would each comprise a transceiver device to send and receive messages.

The two-way wireless telecommunication system 52 is connected to the notification system 50, which is a part of the control system 48. In one embodiment, the two-way wireless telecommunication system 52 comprises a cellular telephone. In this embodiment, the cellular telephone 52 has an antenna 54 that allows for data and voice communication with cellular base stations 22 over wireless telecommunication link 56 using electromagnetic signals (FIG. 1). Thus, the cellular telephone provides for two-way communication between the mobile device and another telephone number, such as that corresponding to an E911 service center.

In other embodiments, the two-way telecommunication system 52 comprises any known wireless telecommunication system, for example satellite or two-way paging systems. The telecommunication system 52 may be used for normal telecommunications (e.g. everyday cellphone use), as well as used to automatically call a predetermined number, such as E911. For example, in some embodiments the system may be used to communicate with a PSAP or other emergency services without human intervention as described in detail elsewhere, such as with reference to the notification system 50.

The position location system 58 is connected to the control system 48 and may comprise a GPS receiver to determine position information in one embodiment. In this embodiment, the GPS receiver receives signals from downlinks 62 from three or four satellites 30 (such as shown in FIG. 1) via an antenna 60 and thus the GPS receiver can trilaterate its own position by processing the signals from downlinks 62 to determine a longitude and latitude position. In another embodiment, the GPS receiver may receive the signals and simply store the position information as GPS pseudo-ranges, that is relative times-of-arrival, instead of trilaterating its own position. The position location system may also calculate speed and direction of travel if the GPS receiver is located within a moving vehicle.

In alternative embodiments, other position location systems can be used; for example the position location system may use trilateration methods based upon receiving signals from base stations, such as cellular base stations. In the Observed Time-Difference (OTD) method, the mobile device measures the relative received times of signals transmitted from a multiplicity of synchronized base stations, and from this information and the location of the base stations determines position information.

In the OTD method, the final position calculation may be done at the mobile device or at some other network entity (e.g. Position Determination Entity, (PDE)). That is, the mobile may fully determine its own position, or the mobile may only determine position information, such as the times of arrival of various received signals and send this information to a base station for computation of a final position.

Another position location method, sometimes called a hybrid method, combines GPS and OTD technologies. Other position location methods include triangulation off other terrestrial systems (e.g. TV signals) and positioning based upon proximity to a known transmitter, or transmitters. For example, the position information may simply be the cell sector number or location that is communicating with a mobile. For very small cell sector sizes, so-called microcells, this position information may provide a precise position location.

Thus, the position location system 58 determines position information about the wireless mobile device 10 and such data may be transmitted to the PSAP 28 or other emergency number automatically or upon request. It should be noted that in one embodiment, the position location system 58 may be located external to the mobile device 10, for example within the vehicle. In this embodiment, the position of the vehicle can be determined and transmitted via the wireless link 32 to the wireless mobile device 10. Thus, the position information may originate from a position location system within the vehicle, or from a position location system within the wireless mobile device, or from both.

Figure 4:
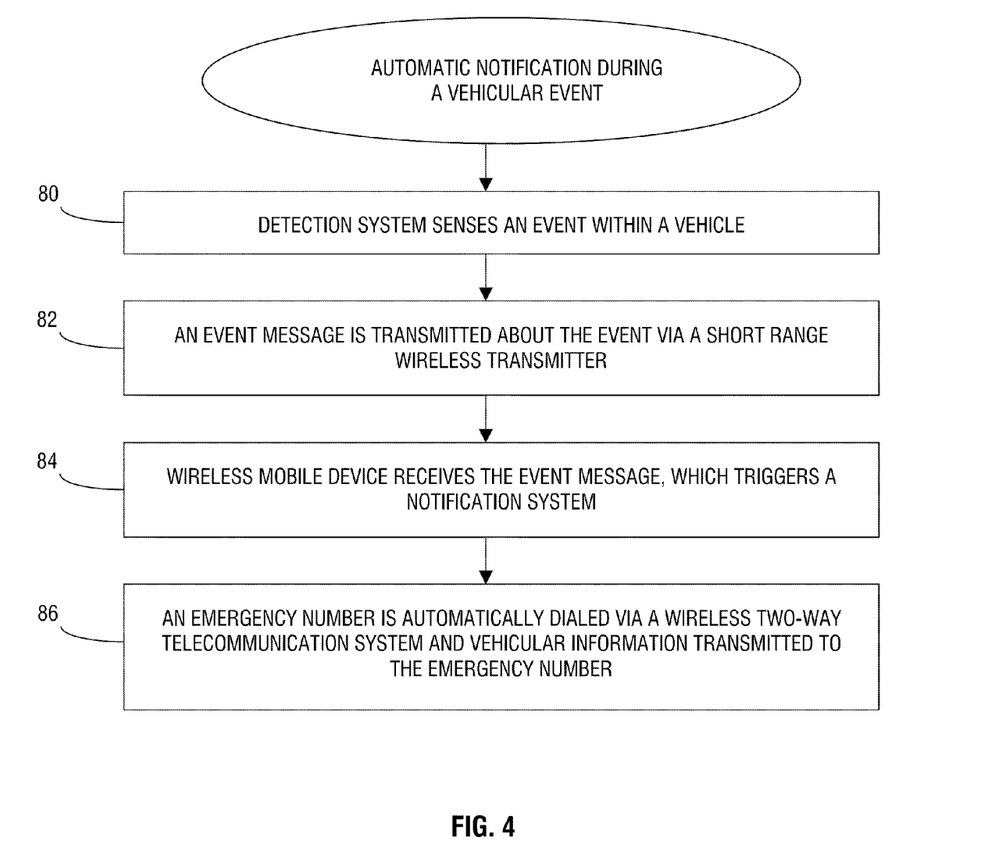
FIG. 4 is flowchart that shows a series of steps performed to automatically notify an emergency service during a vehicular event.
Figure 5:
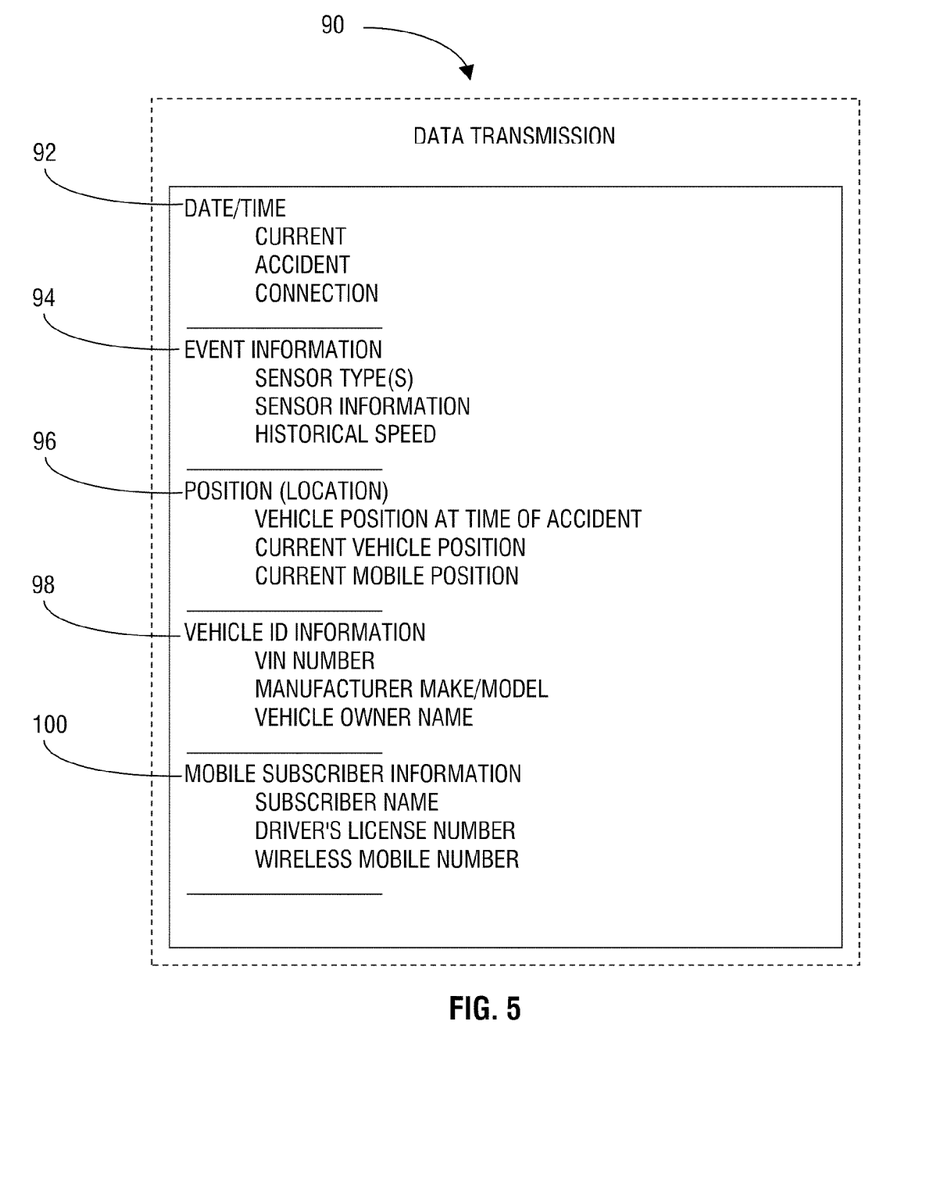
FIG. 5 shows one example embodiment of a data transmission that may be transmitted from a wireless mobile device to an emergency service during a vehicular event.

Reference is now made to FIG. 4, which is a flow chart that illustrates one embodiment in which a vehicle comprising the detection system 16 (such as shown in FIG. 2) wirelessly notifies a mobile device 10 (such as shown in FIG. 3) with a message 20 via a wireless link 32 about a vehicular event. The message 20 triggers notification by the mobile device, including a data transmission such as shown in FIG. 5, directed to an emergency number.

In FIG. 4, at 80, the detection system (described with reference to FIG. 2) within the vehicle senses an event, for example the release of an air bag. Examples of other vehicular events are described elsewhere herein such as with reference to FIG. 1. In other embodiments, non-accident type events could be sensed; for example, excessive speeding by a teen could trigger notification of a parent; or an emergency call button located within the vehicle could be manually pressed in the event of a car-jacking or kidnapping.

At 82, the processor 42 within the detection system 16 receives information from the sensor(s) 40, 41 and transmits an event message 20 via the short range wireless transmitter 44 that a vehicular event has occurred. For example, the event message 20 may indicate that an air bag has been released within the vehicle 14.

In some embodiments, the event message 20 may be one of a predetermined set of messages programmed into the detection system 16. The message may indicate the nature of the accident, vehicular information, and information indicative of an emergency, for example. Additional data such as owner information, may be programmed into the detection system 16 and transmitted to the mobile device 10 automatically or upon request.

At 84, the wireless mobile device 10 receives the event message 20 from the detection system 16 indicating that an event has taken place. In response to the event message 20, the notification system 50 within the wireless mobile device 10 is triggered.

The event message may be standardized across many different types of mobile devices. In one embodiment, the wireless mobile device 10 may be programmed to receive any of a set of standardized messages from the detection system, and to provide the associated processing. For example, a collision detected by the detection system could produce a standardized emergency message indicating a high impact collision, which in turn causes automatic dialing of E911, or other emergency response service, by the mobile device. In alternative embodiments, the mobile device 10 may be programmed to call a predetermined number, such as an emergency number, in response to any message from the detection system and simply transmit to the emergency response center, or to another entity, the event message along with position information.

It should be noted that regardless of whether the wireless mobile device is located in the cab of the vehicle, in the trunk of the vehicle, or even outside (but in the vicinity of) the vehicle, the automatic notification system will function because it does not rely on a hard connections (e.g. "plugging in") in order to receive an event message. Additionally, because mobile devices may be carried from vehicle to vehicle and building to building, one device may be advantageously utilized in a plurality of locations (whether vehicles or buildings). Thus, one wireless mobile device is capable of performing telematics services in numerous locations, without the startup and maintenance costs associated with conventional implementations of telematics; and with electronics (e.g. cellular telephone) already heavily utilized by consumers.

Additionally, because a wide variety of wireless mobile devices are available to consumers, standards may be established to enable functionality across most or all brands and models of wireless mobile devices. That is, messages that are sent from a wireless transmitter within a vehicle could be received and processed using standards that may be implemented across all wireless mobile devices regardless of manufacturer and model.

In alternative embodiments, the wireless mobile device 10 may be multi-mode. That is, the mobile device is configured to receive messages from a plurality of transmitters that may transmit at diverse frequencies or that may transmit diverse messages, for example.

At 86, the automatic notification system is programmed to automatically call E911 or other emergency number via the wireless telecommunication system (e.g. cellphone) and transmit data such as described with reference FIG. 5. For example the nature of the accident, position, and vehicular information may be transmitted to the PSAP.

The vehicle 14 and/or the mobile device 10 may be preprogrammed by a manufacturer or by a user with owner and other information, for example owner's name and driver's license number, similar to that described with reference to 82 above. Such information may be transmitted to the PSAP automatically or upon request.

In some embodiments, only electronic data is transmitted to the PSAP, that is, without voice communication. In other embodiments, voice or synthesized voice communication may be sent along with or in place of electronic data as the implementation and situation dictates. For example, in the event of an accident, a driver and/or passenger may not be able to communicate with the PSAP. In this example, vehicular and positional data may be sent electronically to the PSAP. In an alternative embodiment, the data may be synthesized voice to provide voice communication with the PSAP or another connection that may only be capable of receiving voice communication. In yet another embodiment, the driver or passengers may verbally communicate with PSAP simultaneously during electronic data transfer.

In one example implementation, a method of using a wireless mobile device to notify an emergency response service in response to an emergency event includes sensing the emergency event by a sensor, and communicating sensor information from the sensor to a short range wireless transmitter. In response to the communicated sensor information, the emergency event message is transmitted from the short range wireless transmitter to the wireless mobile device. The emergency event message includes information received from the sensor and information indicative of the emergency event such as data indicating a priority level of emergency to be transmitted to the emergency response service. The position information of the wireless mobile device is then determined. In response to the emergency event message, emergency data is communicated from the wireless mobile device to the emergency response service, wherein the emergency data includes the position information and information indicative of the emergency event. In some embodiments, the sensor is located within a vehicle, in other embodiments the sensor may be located within a structure.

FIG. 5 is a view of an electronic data transmission 90 that may be sent from the wireless mobile device to the PSAP in one embodiment. The information transmitted to the PSAP may be obtained from the detection system 16 (FIG. 2) and/or wireless mobile device 10 (FIG. 3) and transmitted via the two-way wireless telecommunication device within the mobile device.

At 92, date and time information is shown. For example, the current date and time, the date and time of the accident, and the date and time of the initial connection with the PSAP may be transmitted. This may be useful so that emergency service personnel known when the accident occurred and the time delay in responding to the accident. Also, such information may be useful in studying reaction times of the mobile device and the PSAP. The date and time information may be obtained from the vehicle and/or mobile device and may be transmitted in any suitable format.

At 94, event information is shown. For example, information from the primary sensor that was triggered during the event, information from any additional sensors that have triggered during the event, and other information such as historical speed of the vehicle are provided. For example sensor information could include the rate of deceleration detected by the accelerometer, an indication of which airbag(s) have been released, and/or the level of poisonous gases detected. By providing sensor information to the PSAP, emergency service providers can better determine the extent of damage to the vehicle and the proper emergency personnel to dispatch. Additionally, other information such as historical speed, or even acceleration and deceleration of the vehicle, will further determine the extent of the accident or event, possibly aid in determining fault, and provide data to help show common causes of vehicular events. The event information 94 originates from the detection system, and may be transmitted in a standardized format after processing by the detection system processor and/or the control system within the mobile device. In some embodiments, emergency information, such as described in more detail with reference to the event message 20, may be included in the data transmission 90.

At 96, position information is shown. For example, the position of the vehicle at the time of the event, the position of the mobile device at the time of the event, and the current position of the mobile device are provided. This information may be useful in determining the nearest emergency personnel to dispatch; it may also be helpful to the dispatched personnel for locating the accident and any witnesses that might have been present. By providing the vehicle and wireless mobile positions, it may be determined whether or not the wireless mobile owner is within the vehicle, whether the vehicle has moved since the event, and whether the wireless mobile owner has moved since the event. Additionally, such data may be used to provide statistics to prove the effectiveness of the device as well as tracking any "false" alarms. The position may be obtained from position location systems located within the vehicle and the mobile device. The format of the position information may be latitude and longitude, GPS pseudo-ranges, or a cell sector number, such as described in detail with reference to the position location system 58 shown in FIG. 3.

At 98, the vehicle identification information is shown. For example, the VIN, manufacturer make and model, and vehicle owner name may be provided. The VIN and manufacturer information may be programmed into the vehicle or detection system during manufacture of the vehicle. The owner information may also be programmed into the vehicle or detection system by the owner after purchase of the vehicle. By providing accurate vehicular information, police records may be checked, the vehicle can be accurately located by emergency personnel, and the owner may be quickly identified at the scene.

At 100, mobile subscriber information is shown. In this embodiment, the subscriber refers to the subscriber of the wireless mobile device and the information includes the subscriber's name, driver's license number and wireless mobile telephone number. It should be understood that the owner of the vehicle and the subscriber of the wireless mobile device may not be the same person. Additionally, the driver of the vehicle may not be the owner of the vehicle or the subscriber of the wireless device, however such information may expedite the process of identifying persons involved and notification to appropriate persons.

It should be noted that the above described data transmission is one example embodiment of a one-way data transmission. The mobile device may also be configured for two-way data transmissions. For example, the predetermined number (e.g. E911) may be configured to send a request for additional information in response to the data transmission. In this example, the mobile device would respond to the request for additional information with one or more additional data transmissions.

In some embodiments two-way voice transmissions are also possible. For example, the mobile device may be configured to respond to a request for additional information from the predetermined number (e.g. E911) with digital data or synthesized voice communication. Additionally, the mobile device may be configured for enabling actual two-way voice communication between a person in the vicinity of the mobile device and an emergency service personnel. Multiple communications between the wireless mobile device and the emergency service personnel will aid in collecting additional helpful information.

Thus, the mobile device 10 allows for automatic notification to a predetermined number (e.g. E911) during an accident or other event, using standard electronics/hardware (e.g.

a cellphone), located within, or in the vicinity of the vehicle, without the need for additional installation or human intervention.

In another aspect, the method and apparatus described herein integrates the sensor, processor, and communication modem into a single device. With reference to FIGS. 1 and 2, detection system 16 is integrated with a wireless communication modem, similar to wireless telecommunication system 52 of FIG. 3, except that it need only be a one-way communication in its simplest form, in a single device. In this aspect the detection system 16 does not require short range wireless transmitter 44 because sensor 40 and detection system processor 42 communicate directly with a wireless communication device, and associated antenna and control system.

In this aspect of the method and apparatus, detection system 16 senses an event within a vehicle, and in response to that, the wireless communication modem transmits voice or a data message to an external entity, such as a service provider, for example, a PSAP, or private service, such as OnStar. The emergency call does not have to be a voice call and can be a data call which will provide necessary information to an emergency response center or other service provider such as time of an event and event identifier. The data message can include one or more identifying codes such as shown in FIG. 5, or others. For example, the data message could include an event code, such as a code representing an emergency—in the event of a transmission to a PSAP, or other code—in the event of transmission to another service provider such as OnStar, and a user identification code.

Optionally, the device could include a means for determining the position of the device, such as via GPS, assisted-GPS, advanced forward link trilateration (AFLT), other terrestrial-based positioning methodologies, hybrid positioning techniques, or a combination of these technologies. This position information is then transmitted in addition to or within the data message that is transmitted from the integral device to the external entity.

Optionally, the wireless communication modem provides two-way rather than one-way communication capability to the device by incorporating both transmit and receive chains. In this aspect, the network could return data or voice to the device receiver via wireless transmission.

Any variety of wireless communication protocols can be used for transmitting the data message to the external entity. Various wireless communication networks include a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Various types of sensors can be employed in the integrated device. For example, an internal accelerometer detects, for instance, an automobile collision, and automatically transmits a data message to an emergency notification service via the wireless communication modem. The sound of a deploying airbag can also be detected and identified, which can trigger the automated message transmission. Motion sensors are used to detect an emergency event exemplified by detection of deceleration followed up by detection of a shock (collision). This information can be processed together with position information, such as from GPS, which in turn can be used to determine a near zero velocity (stationary object) condition and can be used to compute a device's resting position. Position, velocity (optionally) and an event identifier (optional field such as "collision detected") can be transmitted to the emergency response center automatically upon motion event detection or be transmitted as a result of audio event detection (cry for help) or a combination of the two.

Additionally, audio, motion (velocity) and position information determination can be used together to produce a reliable emergency event detection. GPS can be used to calibrate motion sensors integrated into the device. This way errors associated with the motion sensors will not affect the detection of an emergency event. Alternatively, a motion sensor(s) together with a simple processing unit can be used together to detect a high-g event (such as a collision) and activate the wireless modem for the emergency call. If GPS is not available, coarse location information can also be provided. This coarse location can be derived from alternative means such as a WWAN (cellular), LAN (WiFi), WiMAX, DTV, etc.

In a specific implementation of the integrated device a vehicular key fob contains the integrated device.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A wireless mobile device comprising:
a notification system electrically configured to process an event message received from an event detection system, said event message selected by said event detection system based on a set of preprogrammed messages, the event detection system and notification system included within the wireless mobile device;
a position location system electrically coupled to said notification system that provides position information upon request from said notification system; and
a two-way wireless mobile telecommunications system electrically coupled to said notification system;
wherein said telecommunications system is configured to notify an emergency response service upon request from said notification system and to provide a data transmission including said position information and an event reporting message based on said event message during said notification.

2. The wireless mobile device of claim 1, wherein said two-way telecommunications system comprises a cellular telephone.

3. The wireless mobile device of claim 1, wherein said position location system comprises a GPS receiver.

4. The wireless mobile device of claim 1, wherein the event detection system included within the wireless mobile device is configured to communicate with the notification system via an electrical connection.

5. The wireless mobile device of claim 1, wherein said event reporting message includes transmitting at least one of sensor information or vehicular information.

6. The wireless mobile device of claim 1, wherein said notification system is configured to process event messages received from said event detection system.

7. The wireless mobile device of claim 1, wherein said emergency response service is configured to send a request for additional information in response to said data transmission, and wherein said notification system is configured to respond to said request for additional information by sending at least one additional data transmission.

8. The wireless mobile device of claim 1, wherein said position information comprises one of a latitude and longitude of said mobile device, a plurality of GPS pseudo-ranges, and a plurality of relative times-of-arrivals of signals from a plurality of base stations.

9. A method of providing emergency notification by a wireless mobile device in response to triggering of a sensor, comprising:
    sensing an event by said sensor,
    selecting an event message based on a set of preprogrammed messages with a processor electrically coupled to said sensor;
    transmitting said event message from an event detection system electrically coupled to said sensor, the event detection system contained within the wireless mobile device;
    receiving said event message from the event detection system at a notification system contained within said wireless mobile device;
    determining position information of said wireless transmitter or said wireless mobile device;
    notifying an emergency response service using said wireless mobile device in response to said event message; and
    transmitting data, including said position information and an event reporting message based on said event message, from said wireless mobile device to said emergency response service.

10. The method of claim 9, wherein the step of sensing an event comprises sensing said event within a vehicle, and said sensor is located within said vehicle.

11. The method of claim 9, wherein the step of sensing an event comprises sensing said event within a structure, and said sensor is located within said structure.

12. A non-transitory computer-readable medium encoded with instructions capable of being executed by a computer for providing emergency notification by a wireless mobile device in response to triggering of a sensor, comprising:
    program code to sense an event by said sensor,
    program code to select an event message based on a set of preprogrammed messages with a processor electrically coupled to said sensor;
    program code to transmit said event message from an event detection system electrically coupled to said sensor, the event detection system contained within the wireless mobile device;
    program code to receive said event message from the event detection system at a notification system contained within said wireless mobile device;
    program code to determine position information of said wireless mobile device;
    program code to notify an emergency response service using said wireless mobile device in response to said event message; and
    program code to transmit data, including said position information and an event reporting message based on said event message, from said wireless mobile device to said emergency response service.

13. A wireless mobile device configured to provide emergency notification in response to triggering of a sensor, comprising:
    means for sensing an event by said sensor,
    means for selecting an event message based on a set of preprogrammed messages with a processor electrically coupled to said sensor;
    means for transmitting said event message from an event detection system electrically coupled to said sensor, the event detection system contained within the wireless mobile device;
    means for receiving said event message from the event detection system at a notification system contained within said wireless mobile device;
    means for determining position information of said wireless mobile device;
    means for notifying an emergency response service using said wireless mobile device in response to said event message; and
    means for transmitting data, including said position information and an event reporting message based on said event message, from said wireless mobile device to said emergency response service.

14. The wireless mobile device of claim 13, wherein the means for sensing an event comprises means for sensing said event within a vehicle, and said sensor is located within said vehicle.

15. The wireless mobile device of claim 13, wherein the means for sensing an event comprises means for sensing said event within a structure, and said sensor is located within said structure.

* * * * *

UNITED STATES PATENT AND TRADEMARK OFFICE
CERTIFICATE OF CORRECTION

| | | |
|---|---|---|
| PATENT NO. | : 7,904,053 B2 | Page 1 of 1 |
| APPLICATION NO. | : 12/497426 | |
| DATED | : March 8, 2011 | |
| INVENTOR(S) | : Krasner et al. | |

It is certified that error appears in the above-identified patent and that said Letters Patent is hereby corrected as shown below:

Column 15, line 37, claim 9: "said wireless transmitter or said wireless mobile device;" to read as
--said wireless mobile device;--

Signed and Sealed this
Twenty-fifth Day of September, 2012

David J. Kappos
*Director of the United States Patent and Trademark Office*